Patented Feb. 13, 1951

2,541,678

UNITED STATES PATENT OFFICE 2,541,678

FUNGICIDAL COMPOSITION

Miller W. Swaney, Westfield, and Allen R. Kittleson, Cranford, N. J., assignors to Standard Oil Development Company, a corporation of Delaware No Drawing. Application December 6, 1947, Serial No. 790,224

7 Claims. (Cl. 167—22)

1

This invention relates to new and useful improvements in parasiticidal preparations and more particularly to improved fungicides, insecticides and germicides. This invention also relates to methods of protecting organic material subject to attack by low orders of organisms.

It has now been found that various amine derivatives obtained by the addition and association reactions of alkyl amines and epoxy compounds where at least two molecules of the latter react with one of the former, are extremely effective for destroying or checking the growth of bacteria, fungi and insects.

These compounds may be used as novel ingredients of seed and plant protectants because of their disinfecting action on soil bearing harmful organisms.

These compounds may also be applied to parent materials to rid them of harmful organisms or prevent fungus growth and mildew formation. Since these compounds are exceptionally nonphytotoxic they may be applied safely to a wide variety of plants. Some of the additional parent materials to which they may be applied for protective purposes are leather, wood, fur, wool, coated fabrics and other substances even including animal bodies.

These compounds may best be applied as a

2 diluted dust mixed with a solid carrier such as clay, talc and bentonite. They may also be applied as spray in a liquid carrier, either as a solution in a solvent, or as a suspension in a non-solvent such as water. When applied as a spray in water, it may be desirable to incorporate wetting agents such as sodium lauryl sulfate, alkyl aryl sulfonates, various soaps and other sulfated and sulfonated preparations. They may also be admixed with carriers that are themselves active, such as other parasiticides, hormones, herbicides, fertilizers and wetting agents. Stomach and contact insecticides such as the arsenates, fluorides, rotenone and the various fish poisons and organic insecticides, such as dichloro-diphenyl-trichloroethane, benzene-hexachloride and similar products may also be advantageously added.

As previously stated, these products are prepared by the reactions of alkyl amine and an epoxy compound, where at least two moles of the latter react with one of the former. The hydroxy radical of the resulting alkamines (Whitmore, "Organic Chemistry," p. 392) may then be replaced by a halogen such as chlorine with no diminution of insecticidal activity. The following compounds have been reacted and the parasiticidal activity of the products has been determined.

TABLE I

| | Compounds reacted | | Principal reaction product |
|---|---|---|---|
| A | Dodecyl amine and ethylene oxide | A | $nC_{12}H_{25}N(CH_2CH_2OH)_2$ N-diethanol n-dodecyl amine |
| B | Dodecyl amine and 1,2 epoxy propane | B | 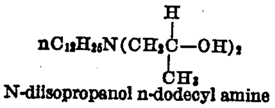 N-diisopropanol n-dodecyl amine |
| C | Products of reaction B converted to the chloride by reaction of the hydrochloride salt with $PCl_5$, followed by neutralization of the amine salt i. e.: 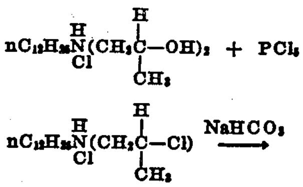 | C | 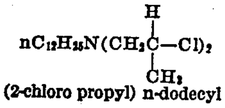 N-bis (2-chloro propyl) n-dodecyl amine |
| D | Dodecyl amine and vinyl ethylene oxide | D | 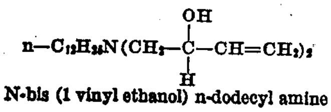 N-bis (1 vinyl ethanol) n-dodecyl amine |

TABLE I—Continued

| | Compounds reacted | | Principal reaction product |
|---|---|---|---|
| E | Octodecyl amine and vinyl ethylene oxide | E | $nC_{18}H_{37}N(CH_2-\overset{OH}{\underset{H}{C}}-CH=CH_2)_2$ N-bis (1 vinyl ethanol) n-octadecyl amine |
| F | Octadecyl amine and ethylene oxide | F | $nC_{18}H_{37}N(CH_2CH_2O\,CH_2CH_2OH)_2$ N-bis (ethoxy ethanol) n-octadecyl amine |
| G | do | G | $nC_{18}H_{37}N(CH_2CH_2OH)_2$ N-diethanol n-octadecyl amine |

It should be borne in mind, however, that while the above listed formulae represent the best available information as to the structure of the major product of the reacted compounds, because of the complexity of the reaction it is impossible to characterize the products of the reaction by a single formula. We therefore do not desire to be limited by the formulae indicated above.

The reason for the foregoing can best be seen by an analysis of the various products which result from the reaction of a primary amine and an epoxy compound.

When 2 moles of a substituted ethylene oxide react with 1 mole of a primary amine the reaction proceeds as follows, the oxygen linkage opening at the point indicated by the dotted bond. This reaction is the predominant one in an alkaline medium and yields a secondary alcohol.

$$R'NH_2 + 2H_2C\underset{\diagdown O \diagup}{——}CH-R'' \longrightarrow R'N(CH_2CH(R'')OH)_2$$

When the oxygen linkage opens at the other point, however, as happens in an acid medium, as indicated below, the primary alcohol is produced in equal quantities as the secondary alcohol.

$$R'NH_2 + 2H_2C\underset{\diagdown O \diagup}{——}CHR'' = R'N(CH(R'')CH_2OH)_2$$

In addition it is possible for 2 molecules of the epoxy compound to polymerize. Thus 4 molecules of an epoxy compound react with an amine yielding the following type product $$R'NH_2 + 4H_2C\underset{\diagdown O \diagup}{——}CHR'' = R'N(CH_2\overset{R''}{\overset{|}{C}}HO\,CH_2\overset{R''}{\overset{|}{C}}HOH)_2$$

In a similar manner additional compounds may be formed as more than 4 molecules of the epoxy compound react with the amine. The primary alcohols may also be produced by this reaction as discussed above. The ether formation is greater when ethylene oxide is the reactant than when substituted epoxy compounds are used.

In general, therefore, and by way of summary, the following are among the types of compounds formed by the indicated reactions of the particular type reactants of this invention.

| General Formula of Principal Reaction Products | Molar Ratio of Amine to Epoxy Compounds Reacting |
|---|---|
| $R'N(CH_2CH(R'')OH)_2$ | 1:2 |
| $R'N(CH(R'')CH_2OH)_2$ | 1:2 |
| $R'N(CH_2\overset{R''}{\overset{|}{C}}HO\ \ CH_2\overset{R''}{\overset{|}{C}}H_2OH)_2$ | 1:4 |
| $R'N\left[(CH_2\overset{R''}{\overset{|}{C}}HO)_{n-1}\ \ CH_2\overset{R''}{\overset{|}{C}}HOH\right]_2$ | 1:2n |

In the products listed above, R' refers to the unsubstituted alkyl group linked to the nitrogen atom derived from the amine compound reactant; R'' refers to a hydrogen, alkyl or alkenyl radical attached to one of the carbon atoms of an epoxy compound reacted with the amine; and $n$ is an integer from 1 to 3. Thus when $n$ is 1, the resulting principal reaction product contains no ether linkage. It is to be understood that the foregoing is intended whenever these symbols are used.

It can be readily seen that a very complex mixture of different compounds is produced during the course of a reaction and the various possible combinations are very great.

Therefore, when the reaction products above identified by letters A–G are hereafter referred to, it is intended to convey that they represent primarily the mixtures of the type products of the reactions of the approximate indicated molar ratio of primary amine and the epoxy compound.

Thus product A represents the products of the reaction of dodecyl amine and ethylene oxide where the molar ratio of the reactants is 1 to 2, respectively.

Compound B represents the products of the reaction between dodecyl amine and 1,2 epoxy propane where the molar ratio of the reactants is 1 to 2, respectively.

The molar ratios of the other reactants will be apparent to those skilled in the art.

The following examples will further illustrate the preparations of these compounds and tests on their uses for the stated purposes.

EXAMPLE 1

80.7 grams of octadecyl amine and 22 cc. of dioxane were charged to a 500 cc. Erlenmeyer flask equipped with a thermometer and an inlet tube extending below the surface of the liquid. One gram of powdered NaOH was added as a catalyst. Ethylene oxide was bubbled into the mixture at room temperature until 53 grams of the oxide had been absorbed. The reactants were allowed to stand at room temperature for one week after which the product was isolated by distilling off the dioxane. The last portion of dioxane was removed at 120° C. under 4 mm. pressure absolute. 133 grams of waxy solid was recovered which was soluble in acetone and methyl alcohol.

*Analysis of product*

| | Per cent C | Per cent H |
|---|---|---|
| Found | 68.23 | 12.31 |
| Theory for $C_{18}H_{37}N(CH_2CH_2OCH_2CH_2OH)_2$ | 70.11 | 12.36 |
| Theory for $C_{18}H_{37}N(CH_2CH_2OH)_2$ | 73.95 | 13.17 |

The analysis indicates that more than 4 molecules of ethylene oxide reacted with each amine. This indicates that the products formed were preponderantly F above. The time required for completion of the reaction may be greatly reduced by carrying out the reaction in a pressure container, thereby permitting an increase in temperature. An example of this method of preparation is given below in Example 2.

EXAMPLE 2

1335 grams of octadecyl amine was dissolved in 2000 cc. of benzene in a 4-liter Erlenmeyer flask. Ten grams of powdered KOH was added to the solution as a catalyst. Ethylene oxide was bubbled into the reaction mixture at 30–40° C. until 500 g. of the oxide had been absorbed. The reactants were allowed to stand at room temperature for 20 hours, after which the mixture was charged to a turbo-mixer and stirred at 80° C. The gauge pressure at the start of the reaction was 32 lbs. After 13 hours at 80° C. the gauge pressure had decreased to zero indicating that most of the ethylene oxide had reacted. The reaction was continued for a total of 20 hours after which the reactants were discharged from the reactor, cooled to room temperature and filtered through clay to remove the catalyst. After stripping off the solvent, 1817 g. of a waxy solid was recovered. On the basis of weight of recovered product, approximately 2.2 molecules of ethylene oxide combined with 1 molecule of octadecyl amine, indicating the formation of preponderantly compound G above.

EXAMPLE 3

The type products listed above as A through G were tested for parasiticidal activity.

The figures given in column I represent the percent mortality of test insects after a 96-hour period following a two-minute immersion in a 0.25% aqueous solution or suspension of the test compound.

The results in column II are given as percent mortality after 96 hours following bloodstream injection of 0.002 ccs. of a 5% solution of the test compound.

The slide germination technique for fungicidal testing was carried out as described by Wellmann and McCallan (Contribution of Boyce Thompson Institute, volume 13, No. III, pages 171–176) and is listed in column III. The concentrations shown are those permitting only 50% germination of spores.

growth, whereas the control plants were heavily infected.

EXAMPLE 5

Laboratory tests showed the compounds of type F to be effective against the organisms which cause bacterial spots on peaches.

EXAMPLE 6

Phenol coefficient tests on a hydrochloride of composition type B gave the value of 20 against *S. aureaus* and 30 against *E. typhi.*

EXAMPLE 7

To test the effectiveness of these compounds in controlling the organism causing late blight on potatoes (*Phytophthora infestans*) a 25% mixture of product D on a solid carrier was dispersed in water to form a spray solution containing 0.25% of the active ingredients. A potato plot was sprayed at weekly intervals during the active growing season. At the end of this period it was found that 38% of the leaves of the sprayed plot were infected with blight whereas 64% of the unsprayed leaves were infected.

This invention has been described with respect to specific embodiments, but it is not to be limited thereby, except as indicated in the appended claims.

What is claimed is:

1. A fungicidal composition comprising an alkamine having the general compositional formula $$R'N[(CH_2\overset{R''}{\overset{|}{C}}HO)_{n-1}CH_2\overset{R''}{\overset{|}{C}}HOH]_2$$

wherein R′ is an alkyl radical having from 12 to 18 carbon atoms, R″ is a radical selected from the group consisting of hydrogen, methyl and vinyl radicals, *n* is an integer of from 1 to 3, and an inert finely divided solid diluent therefor.

2. A parasiticidal composition as in claim 1 wherein the alkamine includes principally N-bis (ethoxy ethanol) n-octadecyl amine.

3. A parasiticidal composition as in claim 1 wherein the alkamine includes principally N-diethanol n-dodecyl amine.

4. A parasiticidal composition as in claim 1 wherein the alkamine includes principally N-diisopropanol n-dodecyl amine.

5. A fungicidal dust composition containing an

| Reaction Product | Column I | | Column II | | Column III | |
|---|---|---|---|---|---|---|
| | Contact Insecticidal Activity | | Bloodstream Insect Activity, Per Cent Kill (American Roach) *Periplanetis americana* | | Fungicidal Inhibiting—Concentration | |
| | *Blatella germanica* (German Roach) | *Omeepeltus saciatus* (Milk Weed Bug) | Male | Female | *Alternaria solania* | *Sclerotinia fruciicola* |
| A | 95 | 65 | 100 | 100 | <0.001 | <0.001 |
| B | 95 | 100 | 100 | 80 | <0.001 | <0.001 |
| C | 60 | 100 | 100 | 80 | | |
| D | 20 | 75 | 100 | 100 | 0.0001 | 0.0001 |
| E | 15 | 15 | 80 | 60 | 0.01 | 0.0001 |
| F | 25 | 65 | 100 | 100 | <0.001 | <0.001 |
| G | 90 | 15 | 100 | 60 | <0.0001 | <0.0001 |
| Nicotine | 42 | 64 | | | | |
| Bordeaux Mixture | | | | | <0.001% Cu | <0.001% Cu |
| Control | 8 | 10 | 25 | 15 | | |

EXAMPLE 4

A group of soil grown bean plants were inoculated with powdery mildew, then sprayed with an 0.5% solution of type F. After several days the sprayed plants showed essentially no mildew alkamine having the general compositional formula $$R'N[(CH_2\overset{R''}{\overset{|}{C}}HO_{n-1}CH_2\overset{R''}{\overset{|}{C}}HOH]_2$$

wherein R′ is an alkyl radical having from 12 to 18 carbon atoms, R″ is a radical selected from the group consisting of hydrogen, methyl and vinyl radicals, and $n$ is an integer of from 1 to 3, as the active ingredient admixed with a powdered clay.

6. A fungicidal composition as in claim 5 in which the clay is bentonite.

7. A fungicidal composition as in claim 6, in which the alkamine includes principally N-bis (ethoxy ethanol) n-octadecyl amine.

MILLER W. SWANEY.
ALLEN R. KITTLESON.

REFERENCES CITED

The following references are of record in the file of this patent:

UNITED STATES PATENTS

| Number | Name | Date |
|---|---|---|
| 1,923,178 | Ulrich et al. | Aug. 22, 1933 |
| 2,174,762 | Schuette et al. | Oct. 3, 1939 |
| 2,195,194 | Ulrich et al. | Mar. 26, 1940 |
| 2,383,564 | Ralston et al. | Aug. 28, 1945 |

FOREIGN PATENTS

| Number | Country | Date |
|---|---|---|
| 297,484 | Great Britain | Sept. 24, 1928 |

OTHER REFERENCES

Padgett et al.: Ind. and Eng. Chem., vol. 32, pp. 486–488 (1940).